Dec. 27, 1938.  C. G. BINGHAM ET AL  2,141,852
MACHINE FOR COATING PRINTERS' ROLLERS
Filed Dec. 24, 1936   4 Sheets-Sheet 1

Inventors:
Carl G. Bingham
Adolph R. Zimmer
By Sheridan, Davis & Cargill
Attys.

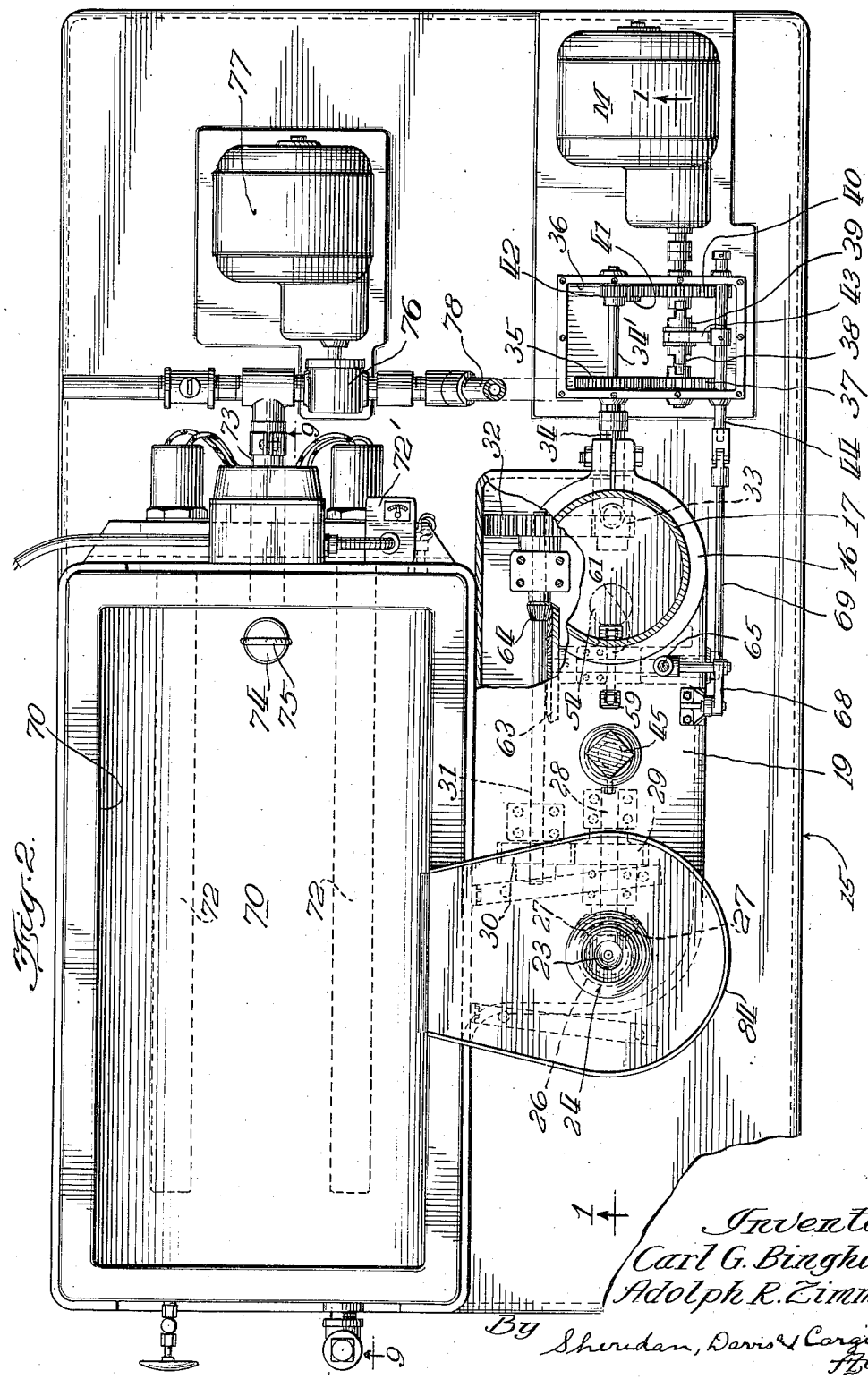

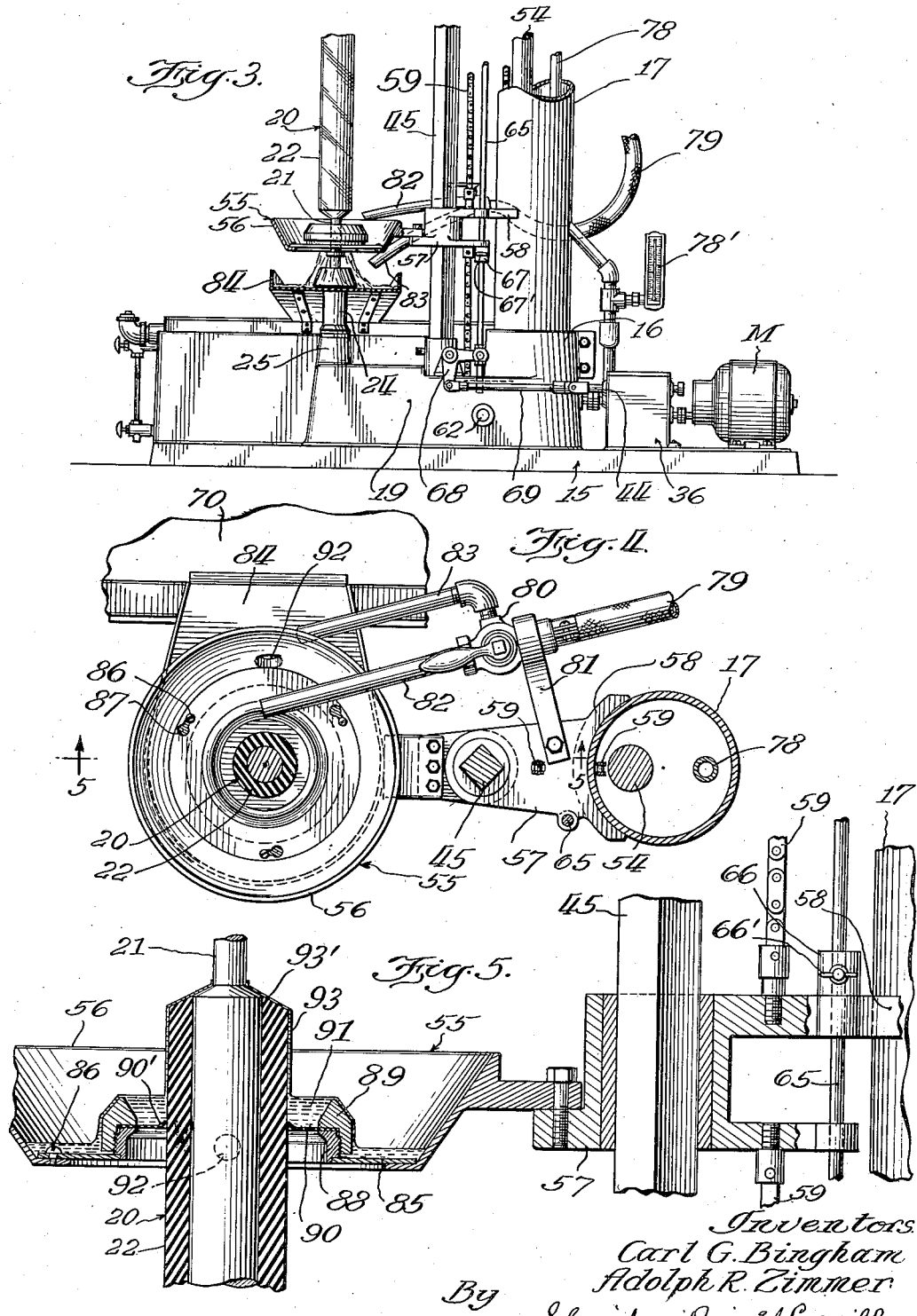

Dec. 27, 1938.  C. G. BINGHAM ET AL  2,141,852
MACHINE FOR COATING PRINTERS' ROLLERS
Filed Dec. 24, 1936    4 Sheets-Sheet 4
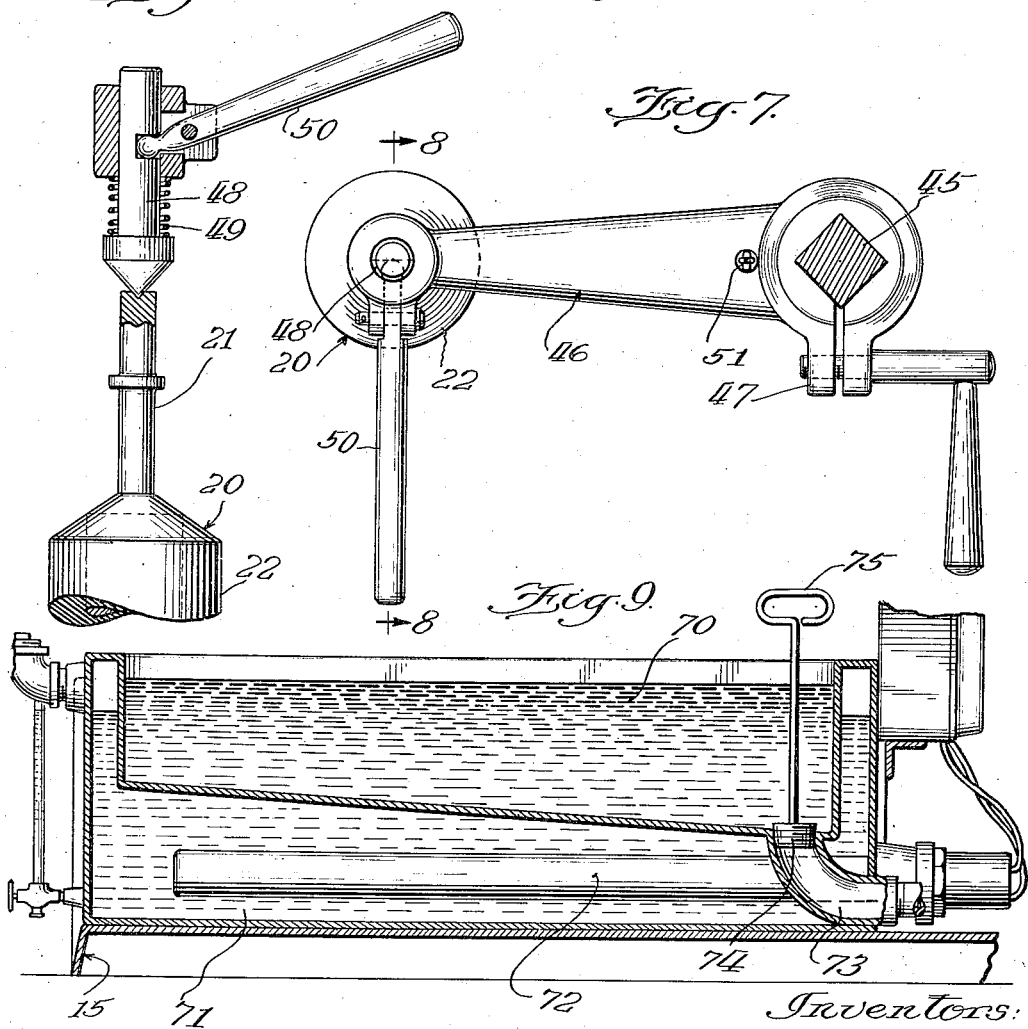
Inventors:
Carl G. Bingham
Adolph R. Zimmer
By Sheridan, Davis & Cargill  Attys.

Patented Dec. 27, 1938

2,141,852

UNITED STATES PATENT OFFICE 2,141,852

MACHINE FOR COATING PRINTERS' ROLLERS

Carl G. Bingham, Highland Park, Ill., and Adolph R. Zimmer, Kansas City, Mo., assignors to Sam'l Bingham's Son Mfg. Co., Chicago, Ill., a corporation of Illinois Application December 24, 1936, Serial No. 117,630

12 Claims. (Cl. 91—46)

Our invention relates to machines for coating printers' rollers of the class comprising core shafts having rubber or other composition cylindrical bodies formed on the shaft, and in which the body is coated with a thin film of surfacing composition. This coating is removed from time to time and the body recoated. Our invention is chiefly concerned with a vertical type of coating machine where the coating is applied while the roller is journaled in vertical position. In general, our invention contemplates an improvement upon the coating machine disclosed in the Linder et al. Patent No. 1,911,124 of May 23, 1933.

Among the objects of our invention are: An improved applicator receptacle; an improved drive for reciprocating the applicator receptacle; automatic controls for the reciprocation of the receptacle; improved and power means for feeding the coating composition to the applicator receptacle; a more accurate and rugged mechanism for aligning the reciprocating applicator receptacle with the axis of the roller; and a more ready means of inserting the roller in the machine.

The foregoing together with further objects, features and advantages of our invention are set forth in the following description of a specific embodiment thereof, which is illustrated in the accompanying drawings, wherein:

Fig. 2 is a plan section taken on the line 2—2 of Fig. 1;

Fig. 3 is a side elevation of the lower portion of the machine, looking in the same direction as in Fig. 1, but showing the applicator receptacle in its lowermost position;

Fig. 4 is a detail plan section taken on the line 4—4 of Fig. 1;

Fig. 5 is a longitudinal vertical section taken on the line 5—5 of Fig. 4;

Fig. 6 is a detail plan view of the top of the casing post, taken along the line 6—6 of Fig. 1;

Fig. 7 is a detail plan of the upper journal for the roller, taken on the line 7—7 of Fig. 1;

Figure 1:
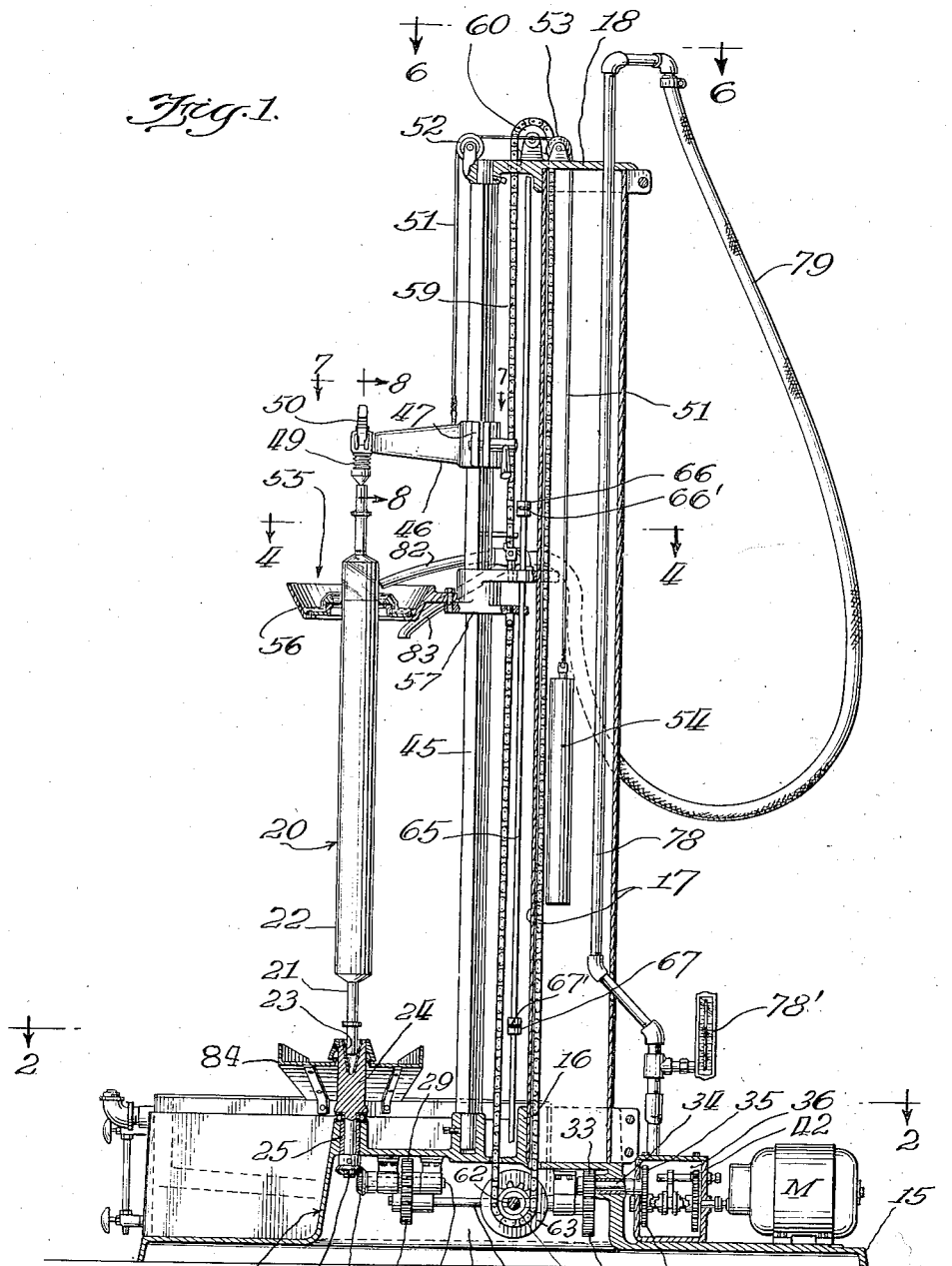
Fig. 1 is a central longitudinal vertical section through a coating machine embodying our invention, taken on the line 1—1 of Fig. 2.

Fig. 8 is a transverse vertical section through the upper journal, taken on the line 8—8 of Figs. 1 and 7; and Fig. 9 is a longitudinal vertical section through the composition supporting tank, taken on the line 9—9 of Fig. 2.

Our coating machine as here shown is mounted upon a base 15, presenting an upwardly facing socket 16 for a hollow post 17 which constitutes a casing and is in the form of a large diameter tube closed at its upper end by a top member 18. A central portion of the base is elevated to form a housing 19 for some of the gears and drive mechanism.

The roller 20 to be coated comprises a shaft 21 and a roller body of the usual resilient material concentrically molded upon the shaft. The roller 20 to be coated is mounted vertically in the machine with the lower end of the shaft 21, which protrudes beyond the body 22, mounted in the conical socket 23 of a chuck 24. The socket 23 is preferably internally corrugated sufficiently to insure the proper frictional drive, but yet one which will yield and slip rather than permit any part abnormally engaging the body to injure the body.

The chuck 24 is journaled in the chuck bearing 25 carried by the frame 15 and, within the housing 19, the lower end of the shaft portion of the chuck 24 carries a beveled gear 26 which is engaged by a mating beveled gear 27 on a horizontal shaft 28 journaled on the base within the housing 19. The shaft 28 also carries a gear 29 which is driven by a mating gear 30 on another and offset horizontal shaft 31 also journaled within the housing 19. The end of the shaft 31 opposite from the gear 30 carries a gear 32, which in turn is driven by a gear 33. The gear 33 is carried on the inner end of the shaft 34, which is journaled in the base 15 and extends from within the housing 19 outwardly thereof and into a transmission housing 36, where its opposite end carries a gear 35.

The gear 35 within the transmission housing is driven by a gear 37 which (Figs. 1 and 2) is freely journaled upon a shaft 38 in the transmission housing. A clutch sleeve 39, which is suitably splined on the shaft 38, is adapted when moved to the left to engage the gear 37 to provide a direct drive from the motor M, the power shaft of the motor being splined to the shaft 38.

The transmission housing 36 also contains gearing adapted to provide a reverse drive, the purpose of which will be later described. This reverse drive includes a gear 40, also freely mounted on the shaft 38 and engaged by the clutch sleeve 39 when the latter is moved to the right. The gear 40, through a reversing gear 41, drives a small gear 42 on the shaft 34, or, more accurately, on an extension 34' of the shaft 34, there being a coupling between the two. The clutch sleeve 39 is reciprocated selectively between its left position, right position, and intermediate neutral position by the usual clutch fork 43 carried by a clutch rod 44 slidably mounted in the transmission casing and extending outwardly thereof. It will be understood that when the clutch rod 44 is moved to the left the motor will drive the shaft 34 in one direction, and when the clutch rod 44 is moved to the right the motor will drive the shaft 34 in the opposite direction because of the reversing gear 41.

For supporting the applicator for vertical reciprocation and for supporting the upper journal for the roller being coated, we provide a rail 45 in the form of a square bar disposed vertically and parallel with the casing post 17 and mounted at its lower end in a socket in the base 15 and at its upper end in a socket in the top member 18.

The upper journal for the roller comprises a bracket 46 having a split clamp 47 with a square bore for receiving the rail 45, whereby the arm 46 may be clamped in any desired vertical position along the rail. The outer end of the bracket 46 slidably carries a vertical journaling pin 48, normally urged downwardly by a spring 49, but which may be withdrawn upwardly by a releasing lever 50, as best shown in Figs. 7 and 8. To facilitate shifting the bracket 46 along the rail 45 and to prevent the weight of the bracket from tending to move the bracket despite its being clamped to the rail, we provide a counter-balance which consists of a cable 51 attached at one end to the bracket 46 and passing upwardly therefrom over a pulley 52 carried by the top member 18, thence horizontally over a pulley 53 also carried by the top member 18, and directly over the interior of the casing post 17, whence the cable 51 passes downwardly within the hollow post 17 where its other end is secured to a counterweight 54.

The coating applicator, generally indicated at 55, is in the form of a receptacle and comprises an outer cup 56 secured to a carriage 57 which is slidably mounted on the rail 45 which passes through a square bore in the carriage 57. The carriage 57 preferably includes an extension 58 (Fig. 4) which is arcuately conformed to ride against the outer cylindrical surface of the post 17, thereby further insuring the accuracy of the centering of the axis of the applicator upon the axis of the roller as it is journaled in the machine. For vertically positioning the applicator 55 and for vertically reciprocating it, we provide a chain 59, one end of which is secured to carriage 57 and passes upwardly over an idling sprocket 60 journaled on the top member 18, and thence downwardly within the casing post 17 and through the bottom thereof and around a drive sprocket 61, and thence upwardly, without the post 17, to the under side of the carriage 57.

The chain drive sprocket 61 is carried by a shaft 62 within the housing 19 which also carries a beveled gear 63, which in turn is driven by a beveled pinion 64 on the previously mentioned shaft 31. The shifting of the clutch sleeve 39 by the clutch rod 44 to its opposite positions will drive the chain 59 to move the applicator 55 either up or down as desired.

For operating the clutch we provide a vertically disposed clutch control rod 65, an upper stop 66, and a lower stop 67 adjustably fixed upon the rod by thumb screw 66' and 67' respectively. As shown in Fig. 3, the lower end of the rod 65 operates a bell-crank 68 and thereby a link 69 which is connected to the clutch rod 44, whereby vertical reciprocation of the clutch control rod 65 will shift the clutch 43 in the transmission housing 36 to cause the applicator 55 to be moved upwardly or downwardly as the case may be.

The stops 66 and 67 are engaged by the applicator carriage 57 for automatically shifting the clutch, as will later be described in connection with the operation of the machine.

The rearward side of the base 15 carries a reservoir 70 for coating composition which is kept in liquid form of the proper consistency by a water jacket 71 heated by electric heating elements 72 under control of the thermostat 72'. Referring particularly to Fig. 9, the bottom of the reservoir proper is inclined to an outlet 73, which may be closed off by a screw plug 74 carrying a convenient handle 75. The outlet passage 73 leads through a pump 76 (Fig. 2) driven by a motor 77. From the pump 76 the composition passes upwardly past a conveniently located thermometer 78' through a standpipe 78, which enters into the interior of the post 17 near its bottom and continues upwardly out through the top member 18, and thence the composition passes through a flexible hose 79 to a two-way nozzle valve 80 (Fig. 4) carried by a bracket 81 on the carriage 57. When the valve 80 is turned one way the composition flows through a nozzle 82 into the applicator 55. When the valve is turned to its other position the liquid passes out through a by-pass or waste pipe 83, whence it drops to a drain pan or apron 84 which surrounds the roller driving chuck 24 and returns the unused composition to the reservoir 70, as best shown in Fig. 2.

The outer cup 56 of the applicator has a flat bottom ring removably held by cap screws 86 in the bottom flange of the cup 56, which cooperate with key-hole shaped slots 87. To the bottom ring 85 is fixed a lower clamping ring 88 which cooperates with an upper clamping ring 89 secured thereto to clamp the outer margin of a diaphragm washer 90 of flexible material, preferably resilient rubber. The diaphragm washer 90 has a central circular opening of diameter very slightly smaller than the body 22 of the roller to be coated, whereby preferably the margin of the washer which contacts the roller body will form a small cusp 90', as shown in Fig. 5. The upper clamping ring 89 is preferably of sufficient height to form an inner cup 91 for receiving composition, and it is into this inner cup 91 that the composition is preferably discharged by the nozzle 82. Any overflow of composition from the inner cup 91 will pass over the upper edge of the upper clamping ring 89 and into the outer cup 56, whence it will pass through a drain hole 92 (Fig. 4) and drop down on to the drain pan 84 and be returned to the reservoir 70.

The operation of our coating machine is as follows:

To start the actual coating, the applicator 55 is set so that the diaphragm 90 comes at or just below the upper end of the cylindrical body of the roller, so that the washer will seal against the body and prevent any liquid composition in the applicator from running down the roller ahead of the washer 90. The roller and the applicator may be put into this starting position in a number of ways. One is to manipulate the control rod 65 by hand to bring the applicator 55 to its bottom position, and the roller may then be set in upright position with the lower protruding end of the shaft 21 extending through the applicator and engaging the socket 23 of the chuck. The upper end is then held by the journaling pin 48 which is raised by means of the handle 50 to permit insertion. If the roller shaft is of different length from that for which the clamp bracket 46 has been set, the bracket may be reset. Then the control rod 65 is depressed to cause the applicator 55 to be raised, and is then stopped when the washer 90 has reached an elevation just below the top of the cylindrical surface of the body. Or, the applicator may be run up higher and then reversed and stopped with the washer at or just below the top of the cylindrical portion of the body of the roller. The latter would have the advantage of initially turning the cusp 90' in the proper direction. This upward movement of the applicator while the roll is in place but preliminary to the actual coating, has the advantage of wiping from the surface of the roller any foreign particles which may be adhering to it. The margin of the opening in the washer is, of course, carefully wiped free from any accumulated coating material or foreign substances before the roller is set in the machine.

Another way of positioning the roller and applicator for actual start of the coating is to run the applicator to a height a little below the upper journal pin, and then insert the roller in position, first engaging the upper end of the shaft, on the journal pin and then setting the bottom end of the shaft in the chuck socket. After that the applicator is run down a short distance until the washer 90 comes at or slightly below the upper end of the cylindrical body. In either case, the upper stop 66 is so set that it will automatically stop the elevating of the applicator short of contact with the journal bracket 46.

After the roller has been set in position and the applicator has been brought to the proper starting position in reference to it—Figures 1 and 5 do not show the applicator in this starting position but in an intermediate operating position after its has started to move down—the valve 80 is turned to discharge the composition through the nozzle 82 and into the reservoir 91 of the applicator. Preferably the pump has previously been started to let the composition material circulate through the piping and hose but by-passed through the nozzle 82 back to the drain pan 84 and reservoir 70, so that the composition will not be delivered to the applicator until after the conduits have been sufficiently warmed up to avoid undue chilling of the composition.

Composition passing from the discharge nozzle 82 first fills the inner reservoir 91 and then overflows into the outer reservoir whence the excess is drained through the outlet 92 and drops onto the drain pan 84. The inner reservoir 91 is of sufficient depth so that when the washer 90 is in the starting position described, the melted coating material will cover the tapered upper end of the body and core of the roller. As soon as the inner reservoir 91 has been filled, the control rod 65 is lifted to engage the clutch to drive the applicator downwardly at a slow and uniform speed and at the same time to rotate the roller. As the applicator descends a conical film 93' of composition will be left on the beveled upper end of the roller body and core and a cylindrical film 93 of composition is left on the cylindrical surface of the body. The excess of composition over what thus adheres as a film, remains in or runs down into the inner reservoir 91. The simultaneous rotation of the roller tends to equalize the film and prevent the accumulation of annular corrugations on the surface of the roller. The cusped inner margin of the washer 90 seals against the surface of the roller to prevent any composition running down the roller ahead of the washer. That would set and cause beads in the completed roller.

As soon as the washer 90 has, in the course of the descent of the applicator 55, passed the bottom end of the cylindrical body of the roller, an opening is formed for the discharge of the composition in the inner reservoir 91.

As this emptying flow, continuously resupplied from the nozzle 82, is directed more or less inwardly, the composition is caused to fall along the bottom beveled end of the body with the result that the film is carried along the conical bottom of the body and core. A stop 67 has been set at such position that after the applicator has descended to proximity to the chuck 24, the clutch will be disengaged.

The pump is then shut off or the valve 80 is turned to discharge through the by-pass 83. The roller is then removed and the remaining composition wiped from the applicator and especially from the inner margin of the washer 90.

While we have shown and described this specific embodiment of our invention, we contemplate that changes and substitutions may be made therein without departing from the scope or spirit of our invention.

We claim:

1. A roller coating device comprising an applicator adapted to surround and descend along a printer's roller to be coated, the applicator comprising an inner reservoir surrounding the roller, a washer at the bottom thereof sealing against the periphery of the roller, and an outer reservoir surrounding said inner reservoir and into which the inner reservoir overflows throughout the periphery of the latter.

2. In a coating machine adapted to coat with composition a printer's roller having a cylindrical body with a frustoconical end, the machine comprising an applicator surrounding the roller and adapted to descend therealong, the applicator comprising an inner reservoir surrounding the roller and radially exposed thereto, a sealing member at the bottom of the inner reservoir for sealing against the periphery of the roller, and an outer reservoir surrounding said inner reservoir and into which the inner reservoir overflows throughout the periphery thereof, the inner reservoir being of a depth greater than the height of the frusto-conical portion of the roller, whereby, when the sealing member is at or near the upper end of the cylindrical body of the roller, the composition in the inner reservoir will cover the frustoconical portion.

3. In a device for coating a printer's roller with a film of composition, an applicator adapted to surround and travel downwardly along the roller to be coated, the applicator comprising a saucer-shaped outer reservoir having a clamping ring adjacent a central opening in its bottom, a second clamping ring cooperating with the first clamping ring to clamp a sealing washer which seals against the periphery of the roller to be coated, the second clamping ring forming the side and the washer forming the bottom of an inner reservoir which overflows into the first reservoir.

4. A coating machine for printers' rollers comprising a rail bar of polygonal cross section, means for non-rotatably mounting the rail bar in vertical position, a journal bracket non-rotatably mounted on the rail bar for adjustment longitudinally thereof, means on the bracket for journaling the upper end of the shaft of the roller to be coated, means for journaling and driving the lower end of the shaft of the roller, an applicator bracket slidably and non-rotatably mounted on the rail bar, an applicator carried by the bracket and surrounding the roller to be coated and therewith forming an annular reservoir for coating material, and means for rotating the roller and progressing the applicator and its bracket downwardly along the rail bar.

5. A coating machine for printers' rollers comprising a vertically mounted rail bar, a vertically mounted standard a spaced distance therefrom, means for vertically mounting a roller to be coated, an applicator surrounding the roller, a bracket therefor slidably mounted on the rail bar and also slidably contacting the surface of the standard whereby the contact with the standard prevents rotation of the bracket about the rail bar, and means for raising and lowering the bracket along the rail bar to cause the applicator to traverse the length of the portion of the roller to be coated.

6. A coating machine for printers' rollers comprising a vertically mounted rail bar, a vertically mounted standard a spaced distance therefrom, means comprising a journal bracket for vertically mounting a roller to be coated, an applicator surrounding the roller, a second bracket therefor slidably mounted on the rail bar and also slidably contacting the surface of the standard whereby the contact with the standard prevents rotation of the bracket about the rail bar, a pulley near the upper end of the standard, a counterweight within the standard, and a cable passing over the pulley and connected at its respective ends to the counterweight and journal bracket for counterbalancing said bracket, and means for raising and lowering said second bracket along the rail bar to cause the applicator to traverse the length of the portion of the roller to be coated.

7. A coating machine for printers' rollers comprising a vertically mounted rail bar, a vertically mounted standard a spaced distance therefrom, means for vertically mounting a roller to be coated comprising a vertically adjustable journal bracket, an applicator surrounding the roller, a second bracket therefor slidably mounted on the rail bar and also slidably contacting the surface of the standard whereby the contact with the standard prevents rotation of the second bracket about the rail bar, a pulley near the upper end of the standard, a counterweight within the standard, and a cable passing over the pulley and connected at its respective ends to the counterweight and said journal bracket for counterbalancing the latter, and means for raising and lowering the second bracket and applicator comprising sprocket wheels near the top and bottom of the standard, a chain connected at its ends to the second bracket and passing over the sprocket wheels, and power means for driving one of the sprocket wheels.

8. A coating machine for printers' rollers comprising a vertically mounted rail bar, a vertically mounted standard a spaced distance therefrom, means for vertically mounting a roller to be coated, an applicator surrounding the roller, a bracket therefor slidably mounted on the rail bar and also slidably contacting the surface of the standard whereby the contact with the standard prevents rotation of the bracket about the rail bar, and means for raising and lowering the bracket and applicator comprising sprocket wheels near the top and bottom of the standard, a chain connected at its ends to the bracket and passing over the sprocket wheels, and power means for driving one of the sprocket wheels.

9. A coating machine for printers' rollers comprising a base, an upright tubular standard mounted thereon, a cap for the upper end of the standard, a rail bar vertically mounted adjacent but without the standard and held at its lower end by the base and at its upper end by an extension of the cap, a chuck spindle vertically journaled in the base and adapted to receive and drive the lower end of the shaft of a printers' roller to be coated, a journal bracket mounted on the rail bar for vertical adjustment therealong and carrying a journal for the upper end of the shaft of the roller, a counterweight for the journal bracket reciprocable within the standard, an applicator surrounding the roller and slidably mounted on the rail bar, a chain secured at its ends to the applicator, wheels mounted on the cap and the base over which the chain passes, the chain wheel at the base constituting a drive sprocket for the chain, and a common power shaft for driving the spindle and reversably driving the sprocket.

10. A coating machine for printers' rollers comprising a base, an upright tubular standard mounted thereon, a cap for the upper end of the standard, a rail bar vertically mounted adjacent but without the standard and held at its lower end by the base and at its upper end by an extension of the cap, a chuck spindle vertically journaled in the base and adapted to receive and drive the lower end of the shaft of a printers' roller to be coated, a journal bracket mounted on the rail bar for vertical adjustment therealong and carrying a journal for the upper end of the shaft of the roller, a counterweight for the journal bracket reciprocable within the standard, an applicator surrounding the roller and slidably mounted on the rail bar, a chain secured at its ends to the applicator, wheels mounted on the cap and the base over which the chain passes, the chain wheel at the base constituting a drive sprocket for the chain, one reach of the chain extending within the standard, and a common power shaft for driving the spindle and reversably driving the sprocket.

11. A coating machine for printers' rollers comprising a base, an upright tubular standard mounted thereon, a cap for the upper end of the standard, a rail bar vertically mounted adjacent but without the standard and held at its lower end by the base and at its upper end by an extension of the cap, a chuck spindle vertically journaled in the base and adapted to receive and drive the lower end of the shaft of a printers' roller to be coated, a journal bracket mounted on the rail bar for vertical adjustment therealong and carrying a journal for the upper end of the shaft of the roller, a counterweight for the journal bracket reciprocable within the standard, an applicator surrounding the roller and slidably mounted on the rail bar, a chain secured at its ends to the applicator, wheels mounted on the cap and the base over which the chain passes, the chain wheel at the base constituting a drive sprocket for the chain, a feed pipe for melted coating material extending upwardly within the standard and, at the upper end of the standard, connected by a flexible hose to the applicator, and a common power shaft for driving the spindle and reversably driving the sprocket.

12. A machine for coating printers' rollers comprising a chuck spindle for receiving and driving the lower end of the shaft of a vertically disposed roller to be coated, a journal bracket, means for mounting the journal bracket for vertical adjustment, a vertically disposed journaling pin reciprocably mounted in the bracket, the lower end of the journaling pin being conformed to engage and journal the upper end of the shaft of the roller, spring means interposed between the pin and bracket for urging the pin downwardly into engagement with the end of the shaft, and a lever pivoted on the bracket and engaging the pin for lifting it against the spring for disengaging the pin from the shaft.

CARL G. BINGHAM.
ADOLPH R. ZIMMER.